XR 3,840,701

United State
Tomii et al.

[11] 3,840,701
[45] Oct. 8, 1974

[54] FIBRE OPTICS ELEMENT FOR THE IMAGE TRANSMISSION SYSTEM OF A FACSIMILE

[75] Inventors: Kaoru Tomii; Eiichi Miyazaki; Tetsuhiko Tomiki, all of Osaka, Japan

[73] Assignee: Matsushita Electric Industrial Company, Osaka, Japan

[22] Filed: Mar. 15, 1972

[21] Appl. No.: 234,768

[52] U.S. Cl. .......... 178/7.2, 178/DIG. 2, 313/92 LF, 350/96 B
[51] Int. Cl. .......... H04n 1/22
[58] Field of Search .......... 178/DIG. 2; 313/92 LF; 250/227; 350/96 B

[56] References Cited

UNITED STATES PATENTS

| | | | |
|---|---|---|---|
| 3,210,597 | 10/1965 | Siegmund et al. | 178/DIG. 2 |
| 3,235,672 | 2/1966 | Beguin | 178/DIG. 2 |

OTHER PUBLICATIONS

Sokolski – Fiber Optic Read Head – IBM Tech Disclosure Bull. Vol. 8, No. 6, Nov. 1965 – pp. 879–880.

Nicoll – Scanner Using Fiber Optics – RCA TN No. 374, June 1960 – pp. 1–2.

*Primary Examiner*—Howard W. Britton
*Attorney, Agent, or Firm*—Depaoli & O'Brien

[57] ABSTRACT

Facsimile apparatus comprising a bundle of first and second groups of optical fibers. The first group of optical fibers has one end thereof cut in a first plane skewed at a first angle relative to a third plane normal to the lengthwise direction of the optical fibers and the second group of optical fibers has one end thereof cut in a second plane skewed at a second angle relative to the third plane. The first group of optical fibers is used for transmitting signal-modulated light for image recording purposes and the second group of optical fibers for non-modulated light for image sensing purposes.

4 Claims, 10 Drawing Figures

3840701
NO ORI CLASSIF

Fig. 1b
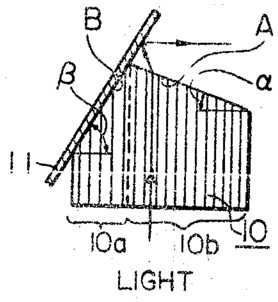
Fig. 1a
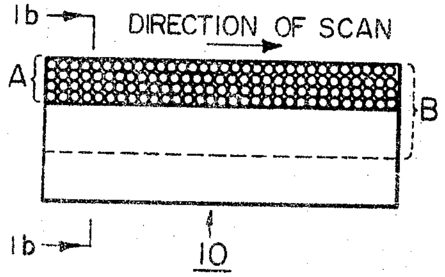
Fig. 3
Fig. 2
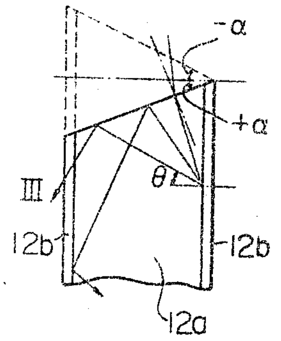
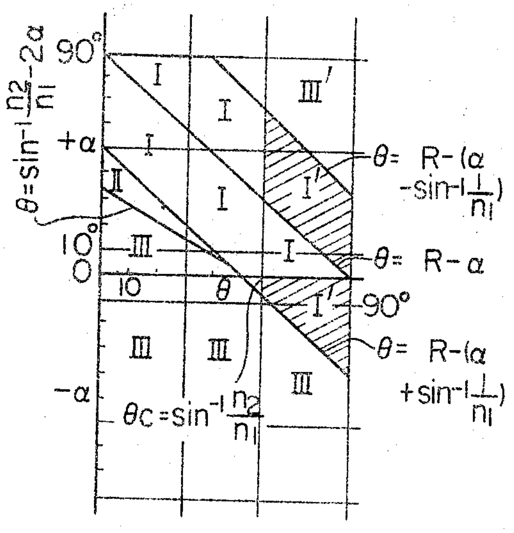

FIBRE OPTICS ELEMENT FOR THE IMAGE TRANSMISSION SYSTEM OF A FACSIMILE

This application is a continuation-in-part application of the application Ser. No. 848,252 filed on Aug. 7, 1969 and now abandoned.

This invention is concerned with facsimile and has particular reference to the a bundle of optical fibers used for image readout and recording purposes.

Application of fiber optics elements to facsimile is well known in the art to achieve high resolution of images because of its small diameter and high transmissivity of light. One prior art facsimile apparatus involves the use of a bundle of fiber-optics elements that are bisectored into two groups, one for transmission of light to illuminate a document spaced from the output end thereof, the other for receiving the light reflected from the document and guiding it to an array of phototransistors. The bundle of fiber-optics elements has its output end facing the document cut in a plane skewed at a predetermined angle relative to the plane of the document, the angle being determined by the refractive index of the material used for the fiber-optics element. Since the output end of the fiber-optics is cut in a single plane, it is necessary to provide an arrangement to bring the document in an intimate contact with the plane to achieve high resolution.

It is accordingly an object of the present invention to provide a bundle of fiber-optics elements used in facsimile for serving the dual purposes of read-out and recording of images.

Another object of the present invention is to provide means for achieving the readout and recording functions by cutting the output end of the bundle of fiber-optics in two planes, one for readout function and the other for recording function.

Foremost of the outstanding features of the image transmission and recording system carrying out this invention are its increased scanning speed and high resolving power, both compatible with a satisfactory percentage of the light utilized.

The image transmission and recording system, or more particularly the scanning means therefor, implementing this invention uses as its essential part a fiber optics element which is formed of a bundle of usual optical fibers. Each of the optical fibers is, as customary in the art, made up of a core of any transparent material surrounded by the cladding of another transparent material having a lower refractive index. If desired, the cladding may be further covered with a layer of light-absorptive material. The outside diameter of an individual fiber is usually determined depending upon the desired resolving power and ranges from the order of millimeters to the order of microns. Also, the fiber optics element may be afforded with vacuum-tightness, if desired.

In the drawings:

FIGS. 1*a* and 1*b* are respectively side and sectional elevations of the fiber optics element of this invention;

FIG. 2 is a view for diagrammatic analysis of the light advancing in a single optical fiber;

FIG. 3 is a graphical representation corresponding to FIG. 2;

Figure 6A:
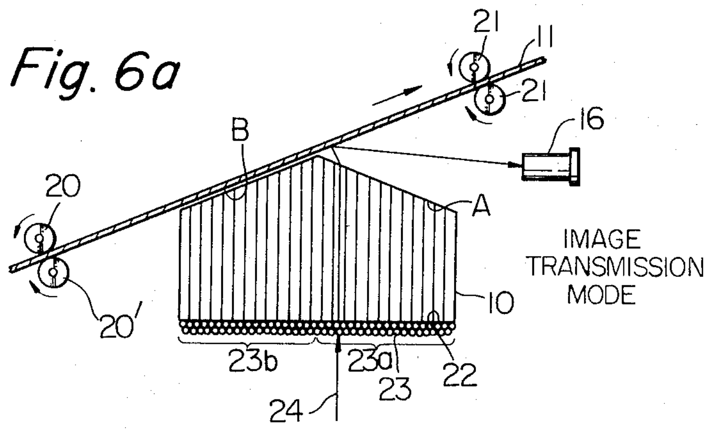
Figure 6B:
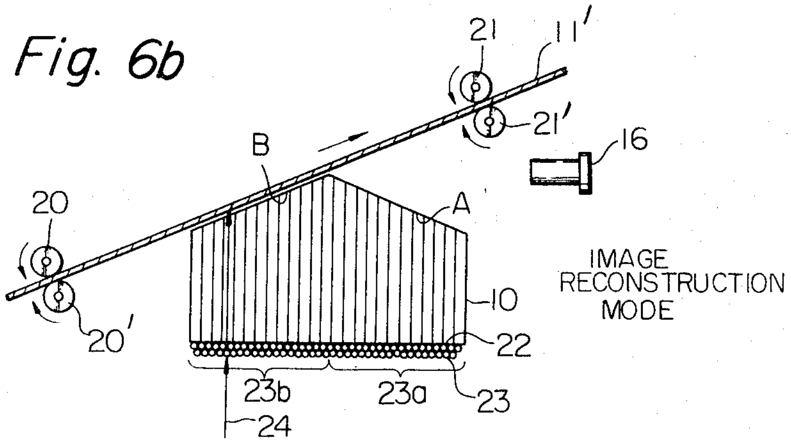
Figure 7:
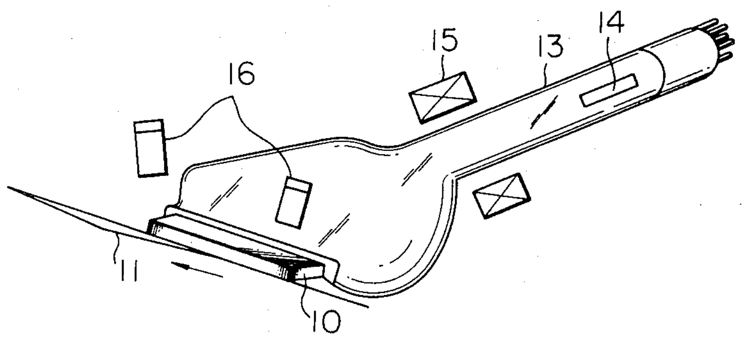
Figure 8:
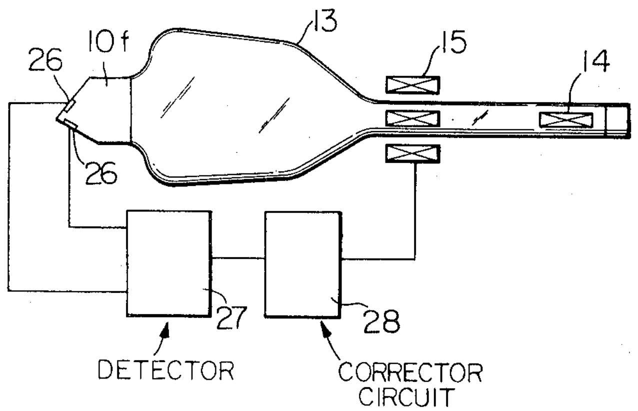

FIG. 6*a* is a cross-sectional view of the fiber optics element with an image carrying sheet in contact with one end thereof, operable in an image transmission mode of operation;

FIG. 6*b* is a cross-sectional view of the fiber optics element with an image developing sheet in contact with one end thereof, operable in an image reconstruction mode of operation; and FIGS. 7 and 8 are perspective views of a scanning apparatus for a facsimile transmitting and receiving system, with the fiber optics element of FIG. 1 provided.

The fiber optics element 10 in accordance with the invention is shown in FIGS. 1*a* and 1*b* and comprises a first group 10*a* of optical fibers and a second group 10*b* of optical fibers. Optical fibers of the first group 10*a* have one end thereof cut in a plane A along a given direction along which a beam of flying spot is scanned as will be described hereinbelow. Optical fibers of the second group 10*b* have one end cut in a plane B along a direction parallel to the first group. These planes A and B are inclined at angles $\alpha$ and $\beta$, respectively from the plane perpendicular to the axes of the optical fibers. Designated with 11 is a document to which the light leaving the fiber optics element 10 is to be projected, which copy is placed direct on or positioned in close proximity to the face B of the element 10 with its portions extending from the edges of the face B. The angle $\alpha$ is so determined that the majority of the light within the optical fiber is allowed out of the tips of them, while the angle $\beta$ is determined in accordance with the desired direction of the light reflected from the document, i.e., depending upon whether the outgoing light is reflected in a direction substantially rectangular to the axes of the fibers or is reflected in any other direction.

It may be mentioned that, although the face B confronting the document 11 is herein illustrated to be a uniplanar slope relative to a perpendicular to the axes of the optical fiber, the face may be configured otherwise, say, as a curved or concave face by way of example, inasmuch as the document 11 in situ makes an angle $\beta$ relative to the plane perpendicular to the axes of the optical fibers plane of the element 10.

Now, FIG. 2 is presented to show how the angle $\alpha$ should be determined. Here, only one optical fiber 12 is exemplified for simplicity of illustration. As shown, the optical fiber 12 is formed of a core 12*a* with a refractive index of $n_1$ and a cladding 12*b* with a refractive index of $n_2$ which is smaller than $n_1$. The light, as it advances within the core 12*a*, is repeatedly totally reflected from the boundary with the cladding 12*b*. If the fiber 12 is assumed to terminate at an angle $\alpha$ to the plane normal to the axis of the fiber 12, then the light lastly reflected from the boundary of the core at a given angle $\theta$ will advance in three different paths: a first portion I of the light admitted out of the cores through the end plane thereof, a second portion II totally reflected backwardly from the end plane, and a third portion III released outwardly through the wall of the cladding after total reflection from the end plane. It is to be noted that there is another light which is reflected from the other wall and is admitted out of the end plane of the fiber tip. Thus, if the light is assumed to be lastly reflected from the boundary of the core at the very point illustrated before it reaches the end plane, taking into consideration the light reflected from the other wall, it may well be considered that the end plane of the fiber 12 is angled either at $+\alpha$ or at $-\alpha$. If the angle $+\alpha$ is to be taken into consideration, the range of the angle $\theta$ for the above mentioned three portions of the light will be given by the following expressions:

$$\theta \geqq \angle R - (\alpha + \sin^{-1} 1/n_1), \text{ for the portion I,}$$

$$\sin^{-1} n_2/n_1 - 2\alpha \leqq \theta \leqq \angle R - (\alpha + \sin^{-1} 1/n_1), \text{ for the portion II,}$$

$$\theta \leqq \sin^{-1} n_2/n_1 - 2\alpha, \text{ for the portion III.}$$

It will be understood that similar expressions can be obtained where the angle $-\alpha$ is taken into account.

If the angle $+\alpha$ increases to a certain extent, then there will come into existence a fourth portion III′ of the light, which is admitted out of the fiber through the wall of the cladding 12*b*. Here, the range of the angle $\theta$ is given by:

$$\theta \geqq \angle R - (\alpha - \sin^{-1} 1/n_1)$$

Now, in order that the majority of the outgoing light be directed toward the portion of the document which extends from the edge of the element 10, the angle $\theta$ must be in the range expressed as:

$$\theta \geqq \angle R - \alpha$$

This particular portion of the outgoing light is herein denoted as the portion I′.

It will readily be understood that the light which advances within the core toward the fiber tip is repeatedly totally reflected from the boundary of the core at the angle defined by:

$$\theta \geqq \sin^{-1} n_2/n_1$$

Thus the portion of the light which the present invention proposes to utilize as advantageous is the light falling within the region indicated by I′ in FIG. 3, which is the graphical representation of the above mathematical expressions. Therefore, a preferred range of the angle $\alpha$ is given by:

$$0 < \alpha \leqq \sin^{-1} 1/n_1$$

The angle $\alpha$ is, as will be appreciated from the foregoing discussion, determined in such a manner as to meet the requirements of (1) permitting the major portion of the input light to be admitted from the individual fibers, (2) minimizing the diffusion of the light emitted from the fibers toward the document, and (3) guiding the light reflected from the document in a desired direction so as not to let the reflected light back into the fibers.

Figure 4:
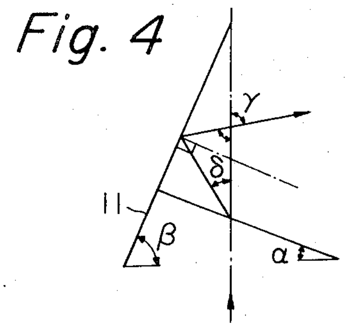
FIG. 4 is an explanatory view of the relative positions of the fiber optics element and the subject copy placed thereon.

FIG. 4 is a view showing how the angle $\beta$ should be determined, wherein consideration is solely paid to that portion of the light which has advanced within a fiber in a direction parallel to the axis of the fiber because such portion of the light accounts for the majority of the output light.

The end of the fiber tip being cut at an angle $\alpha$ to the plane traversing the axis of the fiber, the light leaving the fiber tip is refracted at the end plane of the fiber. The angle $\delta$ at which the outgoing light is refracted can be defined as:

$$\delta = \sin^{-1} (n_1 \cdot \sin\alpha) - \alpha$$

If, on the other hand, the light reflected from the document 11 is directed at an angle of $\gamma$ to the axis of the fiber, then the angle $\beta$ can be obtained from the equation:

$$\beta = \angle R + \delta - \gamma/2$$

where $\delta = \sin^{-1}(n_1 \cdot \sin\alpha) - \alpha$.

Now, let us consider for comparison's sake two representative cases of deriving the light reflected from the document in a direction substantially rectangular to the fiber axis, in one of which the angle $\alpha$ is assumed to be zero degrees and in the other it is assumed to fall within the region I′ in FIG. 3.

When diffused light is incident on the input end of an optical fiber whose output end is angled at zero degrees to the plane traversing the fiber axis and if the document is placed on a plane parallel to the plane of the output end, the output light from the fiber spreads in a substantially circular form on the document, the size of the circle varying with the so-called numerical aperture of the fiber used. If, however, the document is placed at a certain angle to the plane of the output end of the fiber for the purpose of guiding the light reflected from the document in a specific direction, then the light projected to the document from the output end of the fiber spreads in an oval form on the document.

When, in contrast, an angle $\alpha$ falling within the range indicated by region I′ in FIG. 3 is provided at the output end of the fiber, the outgoing light from the fiber tip has a higher directivity for $\delta$ direction as compared with the case where $\alpha = 0$ and, if the reflected light is to be oriented in the same direction as in the case where $\alpha = 0$, the angle which the document makes with respect to the axis of the light incident on the document decreases accordingly. This will means that light projected to the document spreads thereon to a lesser area as compared with the case where $\alpha = 0$.

Figure 5:
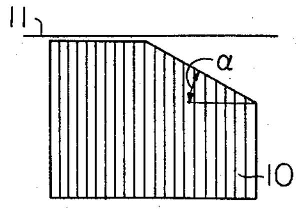
FIG. 5 is view showing a modified form of the fiber optics element of FIGS. 1–*a* and 1–*b*.

FIG. 5 shows another configuration of the fiber optics element as proposed by this invention, wherein the document is so arranged as to be placed perpendicular to the fiber axes and thus $\beta = 0$.

The above described fiber optics element of this invention can be utilized not only for picking up an image carried by a document but also for recording information on a photo-sensitive sheet or web. In FIG. 6a, an image transmission mode of the FIG. 1 arrangement is shown wherein an image carrying text or pictorial matter 1 is movably carried by a pair of idle rollers 21 and 21′ and drive rollers 20 and 20′ which feed the document 11 in close proximity to the face B of the fiber element 10. The fiber element 10 is provided on its rear end face 22 with a phosphorous layer 23 which fluoresces when excited by an electron beam 24 which is, for example, emitted from an electron gun of a cathode ray tube (not shown) is directed to a portion 23*a* of the phosphorous layer 23 corresponding to the first group 10*a*. The electron beam 24 is, on the other hand, repeatedly scanned by a suitable means such as a deflecting coil in a direction parallel to the direction of the edge formed between the planes A and B, whereby a flying-spot is produced moving along the first optical fiber group 10*a*. The flying-spot passes through the fiber element 10 to the face A and leaves therefrom to irradiate the document 11. The flying-spot irradiated on the document 11 is modulated in intensity by the density of image carried thereon and reflected therefrom. The reflected and modulated flying-spot is picked up by a photo-detector 16 positioned in proximity to the face A. The photo-detector 16 then converts the flying-spot into an electrical signal having a voltage proportional to the light intensity of the reflected flying-spot. The electrical signal may be then transmitted through a suitable means to a receiver which may reconvert the electrical signal into the original image.

In FIG. 6*b*, an image reconstruction mode of the FIG. 1 arrangement is shown, wherein an image developing sheet 11' is movably carried by the idle and drive rollers 21, 21' and 20, 20', respectively so as in FIG. 6*a*. The electron beam 24 is, modulated in accordance with a signal transmitted from a transmitting station (not shown) by a well known manner and directed to the portion 23*b* of the phosphor layer 23 corresponding to the second optical fiber group 10*b*. The signal modulated, the flying-spot passes through the element 10 to the face B and then impinges on the web 11'. The image signal is thus reconstructed on the image developing sheet 11'. It is now to be noted that, since the web 11' is placed in close proximity with the face B, the image recording process is effected with extremely high resolution power and without loss of light.

Being apparent from the above description, the arrangements shown in FIGS. 6*a* and 6*b* are interchangeably utilized for both image transmission and reconstruction merely by shifting the electron beam, hence the flying spot in a direction normal to the direction of scanning.

It should be noted that although the phosphorous layer 23 is disposed on the rear end of the fiber element and the electron beam 24 is projected to the layer 23 in the arrangement of FIGS. 6*a* and 6*b*, any other suitable light source of projecting a light beam may be utilized in lieu of the phosphorous layer and the electron beam.

The arrangements in FIGS. 6*a* and 6*b* are, for example, realized by using a flying-spot tube as shown in FIG. 7. The fiber optics element 10 according to the invention is applied to a flying-spot tube with flat envelope 13, electron gun 14 and deflecting coil 15 of usual constructions.

As shown in FIG. 8 light detectors 26 are provided at the end face of the fiber plate 10f in a manner that the light transferred from the fiber plate intervenes inbetween. The electric signals produced at the light detectors 26 are fed to a different detector 27 at which the intensities of the portions of the light are detected. The difference in the electric signals as detected at the difference detector 27 is applied to a corrector circuit 28 whereby signals for correcting the position of the beam are applied to the deflecting coils 15 so as to eliminate the difference in the intensities at the fiber plate 10*f*.

It will now be appreciated from the foregoing description that since the fiber optics element is provided at its one end portion with two end faces inclined from the axes of the fiber of the element and meeting edgewise each other, the fiber element can be utilized for picking-up and recording an image so as to minimize the diffusion and loss of the light. The fiber optics element having such advantages will find extensive applications where an image transmission and recording with a high resolving power at a high percentage of light utilization is desired.

What is claimed is:

1. A bundle of optical fibers with the core element having a refractive index $n$, comprising a first group of optical fibers having one end thereof cut in a first plane and a second group of optical fibers having one end thereof cut in a second plane, said first plane skewed up to $\sin^{-1}(1/n)$ relative to a third plane normal to the lengthwise direction of said optical fibers and said second plane being skewed at an angle smaller than 90° relative to said third plane.

2. In facsimile transmitting apparatus including means for producing a light spot moving in a given direction, means for transporting image carrying medium in a direction normal to said given direction, the improvement comprising:

a. a bundle (10) of optical fibers with the core element having a refractive index $n$, comprising first (10*a*) and second (10*b*) groups of optical fibers successively arranged with their axes perpendicular to said given direction, said first group optical fibers having one end thereof cut in a first plane (A) being skewed up to $\sin^{-1}(1/n)$ relative to a third plane normal to the axis of said optical fibers and said second group optical fibers having one end thereof cut in a second plane (B) being skewed at an angle smaller than 90° relative to said third plane;

b. said moving light spot being made to be incident on the other end (22) of said first group of optical fibers;

c. said image carrying medium (11) being in close proximity to said second plane (B); and d. photoelectrical means (16) adjacent said first plane for picking up light reflected from said image carrying medium.

3. In facsimile receiving apparatus including means for producing a light spot moving in a given direction, said means including means for modulating said light spot in accordance with a signal transmitted from a transmitting station, and means for transporting image developing medium in a direction normal to said given direction, the improvement comprising:

a. a bundle (10) of optical fibers with the core element having a refractive index $n$, comprising first (10*a*) and second (10*b*) groups of optical fibers successively arranged with their axes perpendicular to said given direction, said first group optical fibers having one end thereof cut in a first plane (A) being skewed up to $\sin^{-1}(1/n)$ relative to a third plane normal to said axes and said second group optical fibers having one end thereof cut in a second plane (B) at an angle smaller than 90° relative to said third plane;

b. said signal modulated moving light spot being made to be incident on the other end (22) of said second group of optical fibers; and c. said image developing medium being close proximity to said second plane.

4. In facsimile transmitting and receiving apparatus operable in image transmission and reconstruction modes of operation, including means for producing a light spot moving in a given direction, said means including means for modulated said light spot in accordance with a signal transmitted from a transmitting station and means for shifting said moving light spot in a direction normal to said given direction, means for transporting image carrying medium and image developing medium in a direction normal to said given direction, the improvement comprising:

a. a bundle (10) of optical fibers with the core element having a refractive index *n*, comprising first (10*a*) and second (10*b*) groups of optical fibers successively arranged with their axes perpendicular to said given direction, said first group optical fibers having one end thereof cut in a first plane (A) being skewed up to $\sin_{-}^{1}$ $(1/n)$ relative to a third plane normal to said axes and said second group optical fibers having one end thereof cut in a second plane (B) at an angle smaller than 90° relative to said third plane;

b. said moving light spot being made to be incident on the other end (22) of said first group optical fibers during said image transmission mode;

c. said signal modulated moving light spot being made to be incident on the other end (22) of said second group of optical fibers during said image reconstruction mode;

d. said image carrying medium and said image developing medium being in close proximity to said second plane; and e. photoelectrical means adjacent said first plane for picking up light reflected from said image carrying medium.

* * * * *